United States Patent [19]

Oltendorf

[11] Patent Number: 4,603,283
[45] Date of Patent: Jul. 29, 1986

[54] VARIABLE SPEED CONTROL FOR A BRUSHLESS DIRECT CURRENT MOTOR

[75] Inventor: Norman E. Oltendorf, Algonquin, Ill.

[73] Assignee: Bodine Electric Company, Chicago, Ill.

[21] Appl. No.: 740,864

[22] Filed: Jun. 3, 1985

[51] Int. Cl.$^4$ ............................................. H02P 6/02
[52] U.S. Cl. .................................... 318/254; 318/138; 318/439
[58] Field of Search ................... 318/138, 254 A, 254, 318/439

[56] References Cited

U.S. PATENT DOCUMENTS

| | | | |
|---|---|---|---|
| 3,581,173 | 5/1971 | Hood | 318/254 |
| 3,783,357 | 1/1974 | Ichiyanage | 318/254 X |
| 3,795,848 | 3/1974 | Schaub | 318/138 |
| 3,997,823 | 12/1976 | Machida | 318/138 |
| 4,107,595 | 8/1978 | Campe | 318/254 X |
| 4,162,435 | 7/1979 | Wright | 318/138 |
| 4,169,990 | 10/1979 | Lerdman | 318/138 |
| 4,229,682 | 10/1980 | Goddijn | 318/254 |
| 4,233,548 | 11/1980 | Kirtley, Jr. | 318/138 |
| 4,262,237 | 4/1981 | Gelenius | 318/254 |
| 4,403,177 | 9/1983 | Weber | 318/254 |

FOREIGN PATENT DOCUMENTS

57-193993 11/1982 Japan .................................. 318/254

Primary Examiner—William M. Shoop, Jr.
Assistant Examiner—Bentsu Ro
Attorney, Agent, or Firm—Allegretti, Newitt, Witcoff & McAndrews, Ltd.

[57] ABSTRACT

A variable speed control for an encoderless, brushless, direct current motor. An input signal, representing a desired speed of the motor, is received by both a variable power supply and a counter. The counter responsively issues a sequence of signals corresponding to particular motor windings to be energized. The variable power supply issues a motor supply voltage in accordance with the input signal as well. An error corrector circuit is connected to both the counter and the windings of the motor. The corrector circuit senses a voltage waveform on a winding when the counter signal indicates that the winding is not energized. If the winding voltage waveform deviates from a predetermined standard, the corrector circuit gives a correction command to the variable power supply. The variable power supply accordingly increases or decreases the motor supply voltage.

9 Claims, 7 Drawing Figures

Fig. 2

VARIABLE SPEED CONTROL FOR A BRUSHLESS DIRECT CURRENT MOTOR

BACKGROUND OF THE INVENTION

The present invention relates generally to control circuits and more particularly to a variable speed control circuit for an encoderless, brushless, direct current motor. Many conventional, brushless, dirrrect current ("d.c.") motors have a rotor formed of one or more permanent magnets and a stator employing two or more phase windings. Typically, the stator circumferentially encloses the rotor in spaced relationship. The currents in the stator phases are sequentially controlled in relation to the rotor position. The magnetic flux therefrom interacts with the flux of the permanent magnet rotor, resulting in a force exerted upon the rotor to cause rotation.

Also well known is a brushless d.c. motor of this general type in which there are three phase windings that are "Y" connected. These windings are coupled to the power source through a bridge arrangement of power transistors.

Numerous methods are known in the art for sensing the location and rotational speed of a rotor. Such methods typically involve additional components, such as optical or Hall effect sensors, which generally reside within the motor housing. Such arrangements detect a passing marker or shutter or magnetic field on the rotor.

Such sensors are expensive to manufacture and precisely mount within the motor. Moreover, additional leads must typically be wired between the sensor and the control circuit. The sensor is located within the interior of the motor, and the control circuit, which controls the activation of the windings, is remotely located.

Some sensors and control circuits require only one additional lead between the control circuit and the common connection of the motor windings. Nonetheless, even the addition of one wire adds significantly to the time and expense required to manufacture a motor.

Other techniques for sensing the position or speed of the rotor, or armature, include the use of a shaft rotation tachometer or other speed sensor. Such sensors are frequently not effective for all armature positions or under varying load conditions or when the motor is starting.

Other sensors used with brushless direct current motors fail to allow the speed of the motor to be regulated over widely varying temperature conditions, or do not allow the speed of the motor to be varied over a wide range. Still others are slow to adjust the power applied to the motor in the case of changing load, temperature, or input signals. Finally, other schemes do not provide for changing the voltages applied to the windings (commutation) at optimum times for all load, speed, and temperature conditions or for reverse movement of the motor armature.

SUMMARY OF THE INVENTION

In a principal aspect, the present invention is a variable speed control for an encoderless, brushless, direct current motor. The control includes a variable power supply, counter, power stage, and error corrector.

The variable power supply receives an input signal representing a desired performance (such as speed) of the motor. In response, the variable power supply issues a power signal that is related to the desired performance.

The counter also receives the input signal. In response, the counter issues a signal corresponding to a particular winding to be energized at a particular time in order for the motor to comply with the desired performance.

The power stage receives the signals from both the power supply and counter. Upon receiving the signals, the power stage imposes a power level on one or more windings of the motor. The power level is imposed on the particular winding that is dictated by the counter signal. The magnitude of the power level is dictated by the variable power supply signal.

Finally, the error corrector is interconnected to the motor windings and senses a condition, such as the voltage waveform exhibited by a winding when it is not being energized. The error corrector analyzes the condition to detect deviation from a predetermined standard. For any deviation detected, a correction signal is provided to the variable power supply. As a result, the variable power supply can alter the power level imposed on the windings and reduce the deviation from the predetermined standard.

Accordingly, an object of the present invention is an improved variable speed control for an encoderless, brushless, direct current motor. Another object is an improved control that eliminates the need for motor commutation sensors and their attendant wire connections to the control. Yet another object is an improved control that regulates the speed of a motor without a tachometer or other speed sensor.

A further object of the present invention is a control that more precisely regulates the speed of a motor, independent of the motor load or the temperature within the motor. Yet still another object is an improved control that allows operation of a motor over a wide speed range.

An additional object of the present invention is an improved control that reacts more quickly to changes in the motor load or in the speed signal applied to the motor. Still another object is a control that more closely provides for optimal commutation of the motor for varying loads, speeds, and temperatures and for both directions of rotation.

These and other objects, features, and advantages of the present invention are discussed or apparent in the following detailed description.

BRIEF DESCRIPTION OF THE DRAWING

A preferred embodiment of the present invention is described herein with reference to the drawing wherein.

DETAILED DESCRIPTION OF A PREFERRED EMBODIMENT

Figure 1:
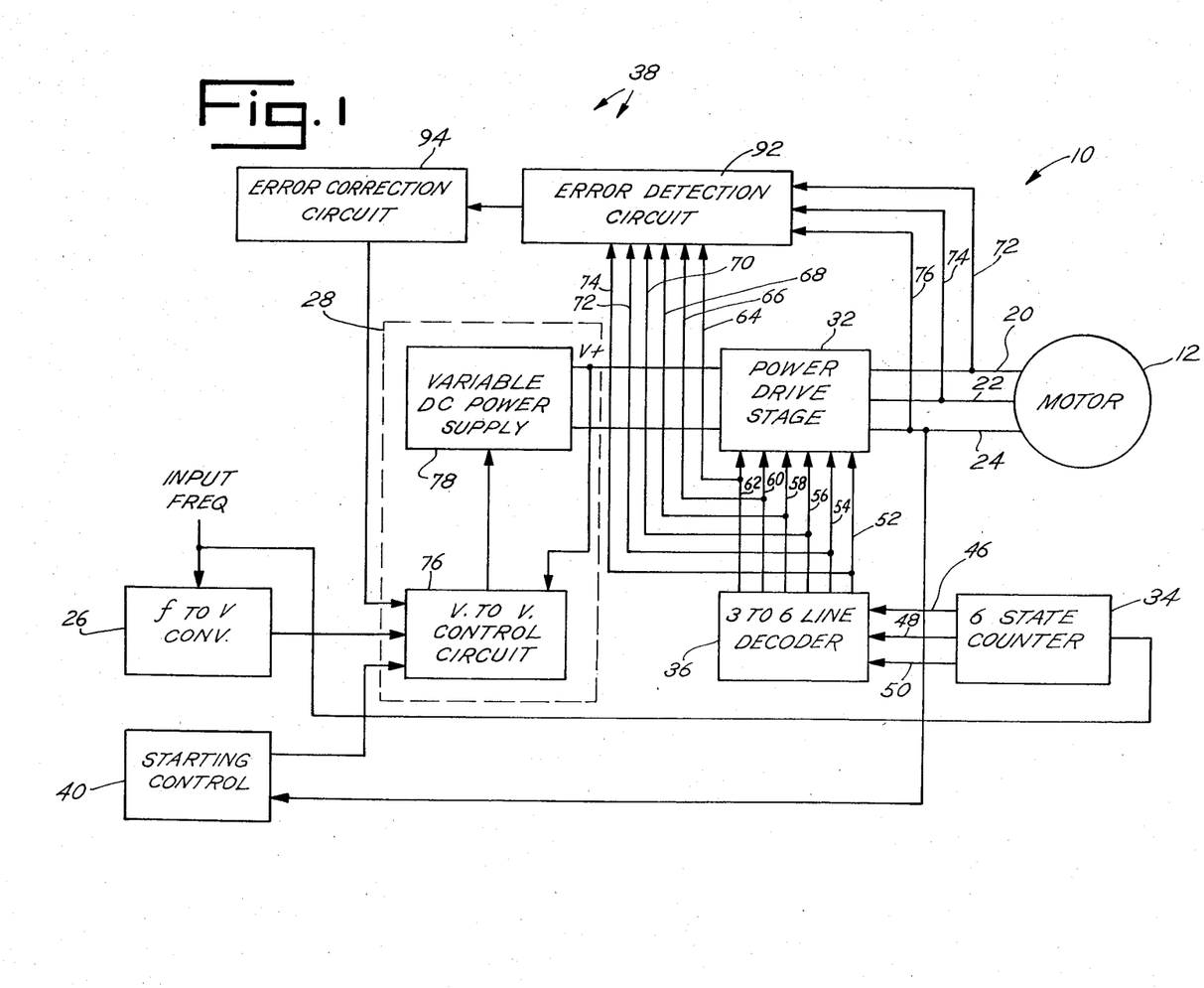
FIG. 1 is a block diagram of a preferred embodiment of the present invention.
Figure 2:
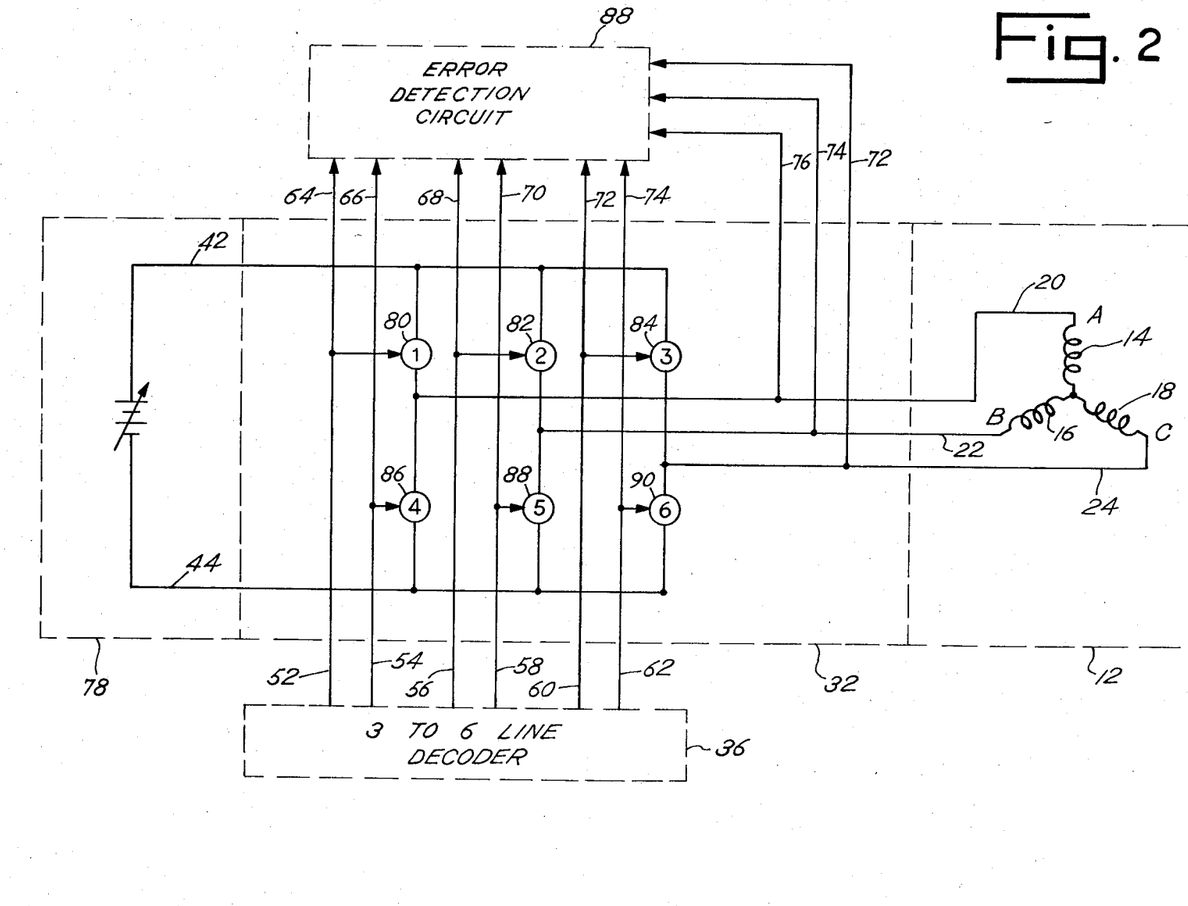
FIG. 2 is a detailed block diagram showing the power drive stage of the preferred embodiment shown in FIG. 1.

Referring to FIGS. 1-7, the preferred embodiment of the present invention is shown as an improved variable speed control 10 for an encoderless, brushless, direct current motor 12. As shown in FIGS. 1 and 2, the motor 12 includes first, second, and third windings 14, 16, 18 spaced 120° apart. The windings 14-18 are interconnected to first, second, and third winding leads 20, 22, 24. Notably, however, the control 10, with only minor modifications, may be used with other multi-phase, brushless, direct current motors as well.

The control 10 includes a frequency to voltage converter 26, pulse width modulated controller 28, power drive stage 32, six state counter 34, three to six line decoder 36, error correcting circuits 38, starting control 40, positive and negative terminals 42, 44, and leads 46, 48, 50, 52, 54, 56, 58, 60, 62, 64, 66, 68, 70, 72, 74.

An input signal includes a voltage waveform having a frequency corresponding to a desired motor speed. The input signal is received by the frequency to voltage converter 26, which provides a substantially direct current ("d.c.") voltage signal to the pulse width modulated controller 28. The pulse width modulated controller 28 includes both a voltage to voltage control circuit 76 and a variable power supply 78.

The voltage control circuit 76 receives the voltage signal from the frequency to voltage converter 26 and responsively provides a control voltage signal to the variable power supply 78. The variable power supply 78, in turn, responsively provides a motor supply voltage, via the positive and negative terminals 42, 44, to the power drive stage 32. The power drive stage 32 accordingly energizes the windings 14-18 of the motor 12.

The input signal is also received by the counter 34. The counter 34 responsively issues state signals, via the leads 46-50, representing a binary number with a value between 1 to 6 (inclusive).

The state signals are received by the decoder 36. For each of the six values issued by the counter 34, the decoder 36 activates a different one of the six leads 52-62.

The power drive stage 32 includes a series of 6 power transistors 80, 82, 84, 86, 88, 90, also designated as 1-6 for convenience in FIG. 2. The transistors 80-90 function as switches, either connecting ("energizing") or disconnecting ("de-energizing") the windings 14-18 from the variable power supply 78. For example, the following sequence may be used to properly turn the transistors 80-90 (shown in FIG. 2) on and off.

| Selected Transistor | State Signal That Will Activate the Selected Transistor |
|---|---|
| 1 | 1 or 6 |
| 2 | 4 or 5 |
| 3 | 2 or 3 |
| 4 | 3 or 4 |
| 5 | 1 or 2 |
| 6 | 5 or 6 |

Thus, assume the state counter 34 initially provides a value of 1. The decoder 36 would then switch transistors 1 and 5 to the ON state, so that they each effectively act as a short circuit. Current will then flow from the positive terminal 42, through the transistor 1, the first winding 14, the second winding 16, the transistor 5, and the negative terminal 44. Thus, the first and second windings 14, 16 are activated to drive the armature, and the second winding is "non-energized" or substantially "isolated" from the power supply 78.

Thereafter, the state counter 34 may issue a signal representing a binary 2. According to the above chart, the decoder 36 would then switch on only transistors 3 and 5. Consequently, current would flow from the positive terminal 42, through the third winding 18, second winding 16, transistor 5, and the negative terminal 44. The second and third windings 16, 18 would then be "energized," driving the armature toward the third winding 16.

The counter 34 would continue issuing signals, corresponding to the numbers 3, 4, 5, and 6, in a like manner. The decoder 36 would responsively energize two of the three windings 14-18, in accordance with the above table, in order to drive the armature in a complete circle.

Upon reaching the value 6, the counter 34 begins counting again with the value 1. The counter 34 does issue a momentary zero value during the transition from the values 6 to 1, but this momentary value may be substantially disregarded in using the present invention.

In addition, the counter 34 could, of course, up-count from 1 to 6 (rather then down-counting from 6 to 1). Such a change would simply reverse the direction of rotation of the armature within the motor 12.

Furthermore, the power drive stage 32 shown in FIG. 2 may also include a diode in parallel with each of the switches 1-6. These diodes would allow current to flow from the negative terminal 44 to the positive terminal 42 of the variable power supply 78. While representations of such diodes have been excluded in order to clarify FIG. 2, such devices to allow a "reverse" current flow is required if the transistors 80-90 are to be kept from failing when a substantial current is applied to the windings 16-20.

As demonstrated by FIG. 2, the rotational speed of the armature within the motor 12 is dependent upon both the voltage level applied by the variable power supply 78 and the speed at which the decoder 36 turns the transistors 80-90 on and off. The variable power supply 78 receives a signal corresponding to the frequency of the input signal, which represents the desired speed of the motor 12. The variable power supply responsively applies a voltage to the motor windings 16-18.

The counter also receives the input signal. The higher the frequency of the input signal, the faster the counter 34 counts, and the faster the decoder 36 operates the transistors 80-90.

The error correcting circuits 38 include both an error detection circuit 92 and an error correction circuit 94. The leads 72-76 interconnect the motor leads 20-24 with the error detection circuit 92. Thus, the error detection circuit 92 is able to sense the voltage waveforms exhibited on the three winding leads 20-24.

The detection circuit 92 analyzes the waveforms and detects if the voltages across the windings 14-18 deviate from a predetermined standard. If such a deviation does exist, an "increase voltage" or "decrease voltage" signal is provided to the error correction circuit 94. The error correction circuit 94 provides a correction signal to the voltage to voltage control circuit 76, so that the voltage applied to the windings 14–18 may be changed.

Figure 4:
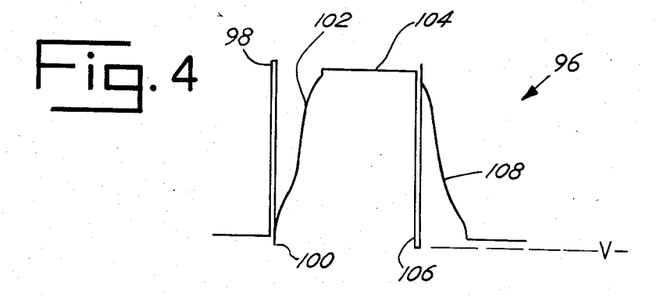
FIG. 4 is a winding voltage waveform that may be sensed by the preferred embodiment shown in FIG. 1 and that indicates the motor supply voltage is at a proper level.

If the voltage applied to two of the windings (such as the first and second windings 14, 16) were proper, Applicant has noted that the voltage waveform of the non-energized third winding 18 would look substantially as the waveform 96 shown in FIG. 4. The waveform 96 displays a large positive spike 98 as the windings 16, 18 are energized, and a short low voltage spike 100, quickly followed by a rippled, inclining segment 102 leading to a maximum level 104. During this time, the switches 2, 3, 5, and 6 shown in FIG. 2 interconnect the variable power supply 78 to the windings 16, 18. The winding 14 is substantially isolated from the variable power supply 78 by the switches 1, 4.

Upon de-energizing the windings 16, 18, the voltage waveform 96 exhibits a large downward spike 106, quickly followed by a rippled, declining segment 108. Changes, for example, in the motor load or temperature of the motor 12 or in the frequency of the input signal will effect the voltages that should be applied to the windings 14–18 for proper operation of the motor 12.

Figure 5:
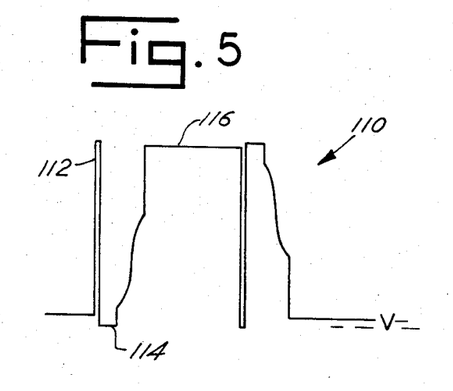
FIG. 5 is a winding voltage waveform that may be sensed by the preferred embodiment shown in FIG. 1 and that indicates the motor supply voltage is too low.

If the voltage applied to the windings 16, 18 is too low, the voltage waveform across a non-energized winding 14 may appear as the waveform 110 shown in FIG. 5. First, the waveform 110 exhibits a large positive spike 112. Unlike the waveform of FIG. 4, however, the spike 112 is followed by a relatively extended segment of voltage substantially equal to zero volts ("zero voltage"). Thereafter, the voltage slopes to a maximum level 116. Applicant has noted that the length of the segment 114 is directly related to the amount by which the voltage applied to the motor windings 16, 18 is too low.

Figure 6:
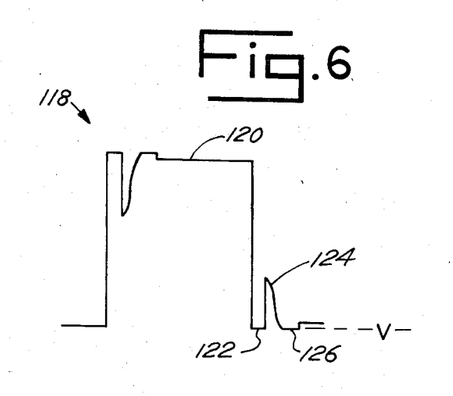
FIG. 6 is a winding voltage waveform that may be sensed by the preferred embodiment shown in FIG. 1 and that indicates the motor supply voltage is too high.

In addition, if the voltage applied to the windings 16, 18 is too high, a voltage waveform 118 across the non-energized winding 14 may appear as shown in FIG. 6. After exhibiting a maximum level 120, the waveform 118 drops to a relatively extended first segment of zero voltage 122. After a short upward spike 124, the waveform exhibits a second segment of zero voltage 126. Applicant has similarly noted that the length of the first and second segments 122, 126 of zero voltage are directly related to the amount by which the voltage applied to the motor windings 16, 18 is too high.

The length of the segments of zero voltage across the windings 14–18 are sensed by the circuit 10. One principle of the present invention thus includes "looking at" the voltages on three motor windings 14–18 during their respective "open" periods (when the transistors 80–90 are "OFF".

For example, the voltage waveform for the first winding 14 must be "looked at" by the circuit 10 when the transistors 1 and 4 (see FIG. 2) are OFF. For a given direction of rotation of the armature, the circuit 10 will look at the waveform of the first winding 14 during the occurence of the state signal "2" to see if an increase in motor supply voltage is needed. Similarly, the correction circuit 10 will look at the first winding waveform voltage during the occurence of the state signal "5" to see if a decrease in voltage is necessary. Such an analysis at a first time to see if an increase in voltage is necessary and at a different time to see if a decrease in voltage is necessary maintains the variable d.c. supply at a proper level for a given input signal, motor load condition, and temperature.

Figure 3:
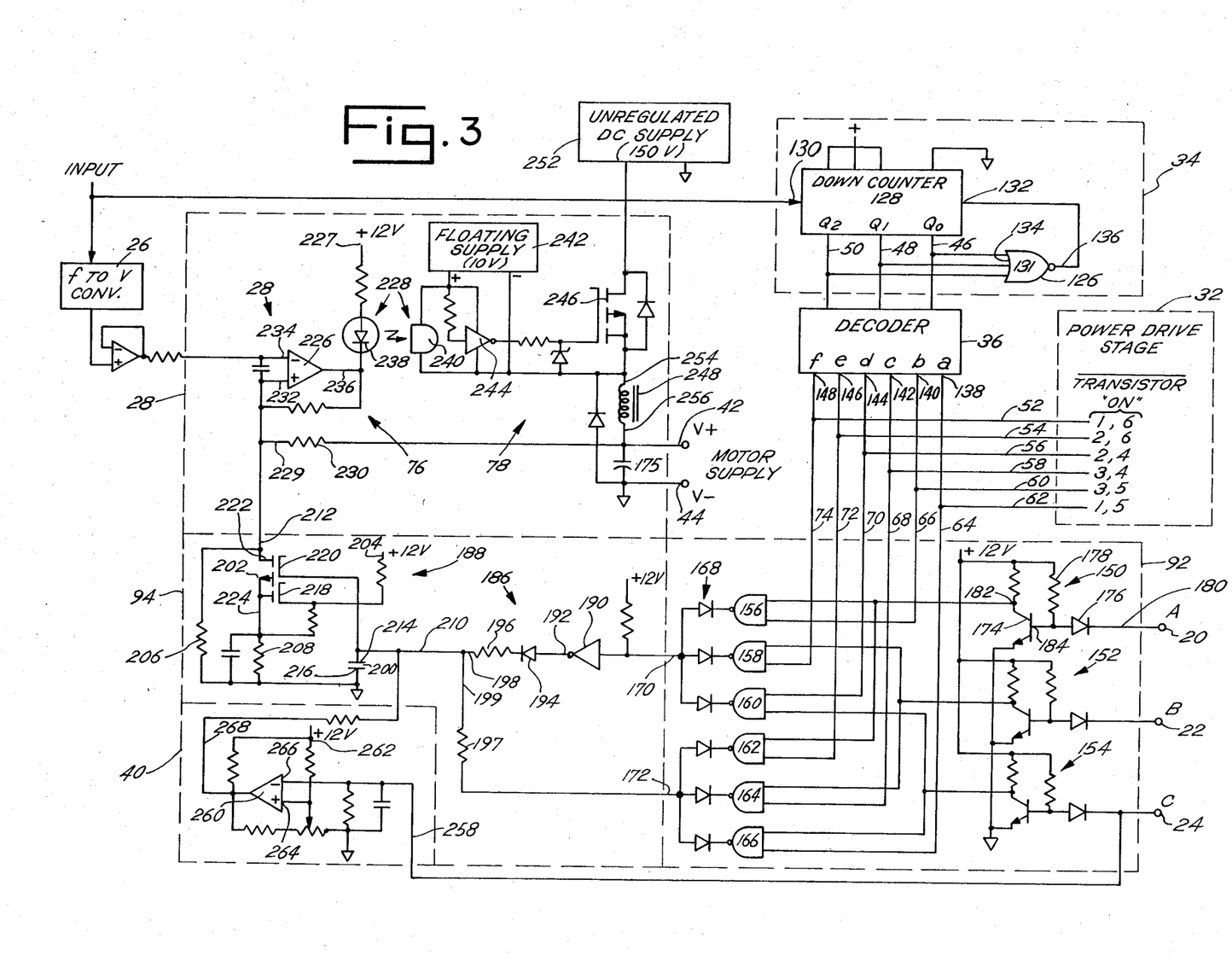
FIG. 3 is a schematic diagram of the preferred embodiment shown in FIG. 1.

The details of the error correction circuit 94 and other components of the control circuit 10 are set forth in FIG. 3. The input signal, having a frequency corresponding to a desired speed of the motor 12, is received by the frequency to voltage converter 26 and the counter 34.

The counter 34 includes a standard CMOS down-counter 128 and NOR gate 130, interconnected as shown in FIG. 3. The down-counter 128 includes a clock input 131 and a preset enable 132.

The input signal is received by the clock input 130. This signal is then used by the down-counter 128 to set the speed at which the sequence of signals which are provided by the down-counter to the three output leads 46–50. The signals imposed upon the three output leads 46–50 of the down-counter 124 correspond to a binary value between 1 and 6 (inclusive).

The NOR gate includes an input 134 and an output lead 136. The input 134 is interconnected to the three output leads 46–50 of the down-counter 128. The output lead 136 of the NOR gate is connected to the preset enable 132 of the down-counter 128. Thus, when the signal of all three output leads 46–50 is zero, the NOR gate gives a high, or "1", value to the preset enable 132, causing the down-counter 128 to begin counting at 6.

The three output leads 46–50 of the down-counter 128 are also interconnected to the decoder 36. In the preferred embodiment, the decoder 36 is a standard CMOS decoder and includes six output terminals 138, 140, 142, 144, 146, 148. Upon receiving the binary signal representing a value of 1 to 6 from the down-counter 128, the decoder 36 gives an appropriate signal to one of the six terminals 138–148.

Thus, for example, upon receiving the binary 1 signal from the down-counter 128, the decoder 36 gives a positive voltage to output lead 138. Upon receiving a binary 2, the decoder 36 presents a positive output pulse along the output lead 140.

In this manner, the decoder 36 will alternatively present a positive voltage at the terminals 138–148 (marked as a, b, c, d, e, and f for convenience in FIG. 3). In response, the proper transistor 80–90 (FIG. 2) will be turned on to energize a proper combination of the motor windings 14–18.

As shown in FIG. 3, the six output terminals 138–148 of the decoder 36 are also interconnected to the error detection circuit 92. The error detection circuit 92 includes first, second, and third sensing assemblies 150, 152, 154, first, second, and third increase voltage NAND gates 156, 158, 160, first, second, and third decrease voltage NAND gates 162, 164, 166, isolating diodes 168, first voltage lead 170, and second voltage lead 172.

Each of the sensing assemblies 150–54 is structurally similar to the others. Hence, only the structure and operation of the first sensing assembly 150 is discussed below. The first sensing assembly 150 includes a sensing transistor 174, voltage drop diode 176, biasing resistor 178, and sensing lead 180. The transistor 174 includes a collector 182 and base 184.

The collector 174 is interconnected to both the increase voltage NAND gate 156 and a decrease voltage NAND gate 162. The base 184 is interconnected to the voltage drop diode 176 which, in turn, is interconnected to the sensing lead 180 and motor lead 20.

The bias resistor 178 normally keeps the transistor 174 in an ON state, such that the voltage at the collector 182 is near zero. When, however, the voltage at the sensing lead 180 drops to zero, the transistor 174 turns off. Consequently, the voltage at the collector 182 of the transistor 184 goes to a high state.

For example, if the second ("b") output 140 of the decoder 36 is at a high level, indicating that the first winding 16 of the motor 12 is not being energized, and the voltage of the collector 182 goes to a high value, indicating that the voltage at the first winding 16 has gone to a near-zero value, the output of the NAND gate will fall to a low level. As a result, a low voltage is applied to the first voltage lead 170 instead of a high value. In a like manner, the other increase voltage NAND gates 158, 160, will only sustain a low output voltage only under two conditions: (1) the decoder 36 indicates that a particular winding is non-energized and (2) that particular winding is exhibiting a voltage substantially equal to zero.

In a similar fashion, the NAND gate 162 will supply a low voltage only when two other conditions are met: (1) the decoder 36 gives a positive signal along the fifth ("e") output lead 138, indicating that the first motor winding 14 is not energized, and (2) the collector 182 goes to a high level, indicating that the voltage at the winding 16 is being maintained at a value substantially equal to zero. Also, the second and third decrease voltage NAND gates 164, 166 will only supply a negative output when a decoder signal indicates that a particular winding is not being energized and a sensing transistor indicates that the voltage at the particular winding of the motor 12 is near zero.

The signals along the first and second voltage leads 170, 172 are applied to the error correction circuit 94. The error correction circuit 94 includes a conditioning assembly 186 and a variable resistance assembly 188. The conditioning assembly 186 includes a signal inverter 190, having an output 192, isolation diode 194, and current limiting resistors 196, 197, increase voltage lead 198, and decrease voltage lead 199.

Upon receiving a signal upon the first lead 170, the output 192 of the inverting amplifier 190 goes to a high value. The high value is then passed to the variable resistance assembly 188, via the isolation diode 194 and current limiting resistor 196, and increase voltage lead 198.

When a low value is sensed along the second voltage lead 172, the low value is passed directly through the current limiting resistor 197 and decrease voltage lead 199 to the variable resistance assembly 188. Thus, the variable resistance assembly 188 receives a high voltage when an increase voltage signal is being sent by the increase voltage lead 198 and a low voltage signal when a decrease voltage signal is being sent by the decrease voltage lead 199.

The variable resistance assembly 188 includes a storage capacitor 200, Field Effect Transistor ("FET") 202, power supply 204, shunt resistor 206, source resistor 208, input lead 210, and output lead 212. The storage capacitor 200 includes positive and negative terminals 214, 216. The input lead 210 receives the signals from the conditioning assembly 186 and applies the voltage signals to the storage capacitor 200.

The FET 202 includes two gates 218, 220, a drain 222, and a source 224. The first gate 218 is interconnected to the power supply 204, and the second gate 220 is interconnected to the positive terminal 214 of the capacitor 200. The first gate 218 maintains the FET 202 such that the resistance between the drain 22 and source 224 of the FET 202 is moderate. Increases or decreases in voltage at the positive terminal 214 of the capacitor 200 will decrease or increase the resistance across the drain 222 to source 224 of the FET 202.

The resistance sensed by the output lead 212 of the resistance assembly 188 is affected not only by the resistance between the drain 222 and source 224 of the FET 202, but also by the shunt resistor 206, interconnected between the drain 222 of the FET 202 and ground, and the source resistor 208, interconnected between the source 224 of the FET 202 and ground.

Figure 7:
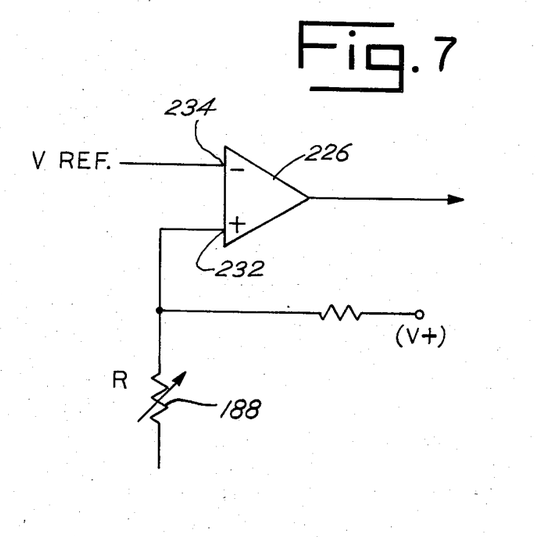
FIG. 7 is a schematic diagram showing a model of the voltage to voltage control circuit shown in FIG. 1.

The resistance of the FET 202, shunt resistor 206, and source resistor 208 are "seen" by the output lead 212 as a single resistor which varies according to the charge placed upon the positive terminal 214 of the capacitor 200. A representation of a model of the resistance assembly 188 is shown in FIG. 7.

The output lead 212 of the variable resistance assembly 188 is interconnected to the pulse width modulated control 28, which includes both the voltage to voltage control circuit 76 and the variable (d.c.) power supply 78. The voltage to voltage control circuit 76 includes a comparator 226, positive power supply 227, opto-isolator 228, reference line 229 and reference resistor 230.

The comparator 226 includes positive and negative input leads 232, 234, and an output lead 236 interconnected to the opto-isolator 228. The positive input lead 232 is interconnected to both the output lead 212 of the variable resistance assembly 108 and the reference line 229. The negative input 234 is interconnected to the output from the frequency to voltage converter 26.

The reference line 229 is interconnected, via the reference resistor 230, to the positive terminal 42 of the variable power supply 78 (motor supply voltage). See FIGS. 3 and 7. Consequently, the voltage applied to the positive input lead 232 of the comparator 226 is directly related to the voltage drop over both the reference resistor 230 and the resistance assembly 188.

As may be seen in FIGS. 3 and 7, the more charge placed upon the capacitor 200, the lower the resistance of the resistance assembly 188. A low resistance for the resistance assembly 188 (or a low voltage at the positive terminal 42) will cause the comparator 226 to provide a zero voltage along the output lead 236.

The pulses supplied by the comparator 226 are passed through the opto-isolator 228. The opto-isolator 228 includes a transmitter (LED) 238 and receiver (phototransistor) 240. When the output of the comparator 226 drops to near zero, the transmitter 238 sends a beam of light to the receiver 240. When a positive voltage occurs at the output lead 236 of the comparator 226, then the transmitter 238 of the opto-isolator 230 discontinues sending a signal to the receiver 240.

The variable power supply 78 includes a floating voltage supply 242, signal inverter 244, FET 246, and choke (inductor) 248. The variable power supply 78 also utilizes an unregulated d.c. supply 252. The choke 248 includes input and output terminals 254, 256.

The receiver 240 of the opto-isolator 228 is interconnected to the variable power supply 78 as shown in FIG. 3. When the transmitter 238 sends a pulse of light, the input to the signal inverter 244 drops to a low value, and a positive pulse is applied to the FET 246. The FET 246 then assumes a low resistance, such that power from the unregulated d.c. supply 252 flows substantially directly into the input terminal 254 of the choke 248.

When the receiver 240 of the opto-isolator 228 no longer receives a pulse from the transmitter 238, the signal inverter 244 receives a large positive signal at its input from the floating supply 242. The signal inverter 244 then supplies a low voltage to the the FET 246, causing the FET's resistance to increase substantially. As a result, current from the unregulated d.c. supply 252 to the choke 248 is substantially blocked.

The output terminal 256 of the choke 248 provides a substantially smooth output voltage with respect to the square wave input received at the input terminal 254. The output of the choke 248 is directly interconnected to the positive lead 42 of the motor supply.

Of course, the motor 12 must be running before a correction signal can be obtained at the input 210 to the variable resistance assembly 188. Thus, the separate starting control 40 supplies such a correction signal while the motor 12 is beginning to run.

The starting control 40 includes a sensing lead 258, differential amplifier 260, and positive voltage supply 262. The differential amplifier 260 includes positive and negative inputs 264, 266 and an output lead 268, interconnected to the positive terminal 214 of the supply capacitor 200.

The sensing lead 258 is interconnected to the negative input 266 of the differential amplifier, and the positive input 264 is interconnected to the positive voltage supply 262. Thus, when the sensing lead 258 detects a low voltage at the motor winding 18, and power has been supplied to the amplifier 260 via the positive lead 264, a large positive voltage is applied by the differential amplifier 266, via the output lead 260, to the positive terminal 214 of the capacitor 200.

When the sensing lead 258 detects a voltage at the motor winding 18 comparable to the voltage applied to the positive terminal 264 of the differential amplifier 260, the differential amplifier 260 no longer supplies any signal to the supply capacitor 200.

The operation of the control 10 is thus substantially as follows. The input signal is received by the down-counter 128, which provides a sequence of binary values to the decoder 36. The decoder 36, in turn, provides a positive voltage at one of its six output terminals 138–148.

The signal from the decoder 36 is received by the drive transistors 80–90 to selectively turn the motor windings 14–18 on and off in an appropriate sequence. The faster the frequency of the input signal, the faster the down-counter 128 counts, and the faster that the decoder 36 changes the pulses along its output leads.

In addition, the error detection circuit 92 receives the output from the decoder 34 as well as sensing the voltages along the motor windings 14–18. When the error detection circuit 92 senses from the decoder 34 that a particular winding is not being energized and that the winding is displaying a substantially zero voltage, a signal is supplied to the error correction circuit 94.

The capacitor 200 thus receives a positive voltage signal if the motor winding maintains a zero voltage at the beginning of the waveform, indicating the motor supply voltage is too low. The storage capacitor receives a negative voltage signal, however, if the waveform shows a zero voltage at the end of the waveform, indicating that the motor supply voltage is too high.

The voltage applied to capacitor 200 affects the resistance between the drain 222 and source 224 of the FET 202. A change in resistance affects the duty cycle of the pulse width modulated controller 28. Consequently, either a greater or lesser voltage is supplied to the motor supply lead 42.

The start control 40 ensures that the motor supply voltage is sensed as being too low until the motor 12 has begun to run. This assures that the motor 12 can develop enough torque to start turning under a fairly loaded condition. A typical start run speed may be 100 revolutions per minute. As soon as the motor 12 runs, however, a voltage waveform is developed and sensed by the start circuit comparator 260. When the speed goes above 100 r.p.m. or another preset speed, the output of the comparator 260 goes to zero, and the storage capacitor voltage will decay to some lower value, thus raising the value of the variable resistance and lowering the motor supply voltage.

With the start circuit comparator 260 now staying at the zero output level, the error signals supplied by the error detection circuit 92 "take over" and establish the proper motor running condition. The motor 12 can then be ramped to the desired operating speed. The start control comparator 260 output could, of course, be used to indicate when the motor speed is above a predetermined value.

In the preferred embodiment discussed herein, the error detection circuit 92 looks for "an increase voltage" signal during 50% of the motor winding voltage waveform. Similarly, the error detection circuit 92 looks for a "decrease voltage" signal during the remaining one-half of the voltage waveform. Because of the substantial waveform symmetry of the voltage on a motor winding, it is possible to examine and analyze the waveforms with respect to the voltage on the motor windings with respect to a positive voltage (rather than a negative voltage). Thus, the time of review for noting a required increase in voltage or decrease in voltage could be increased to 100% of the waveform.

A single preferred embodiment of the present invention has been described herein. It is to be understood, however, that changes and modifications can be made without departing from the true scope and spirit of the present invention. This true scope and spirit are defined by the following claims, to be interpreted in light of the foregoing specification.

What is claimed is:

1. A control for a brushless, direct current motor, said motor including a plurality of windings and said windings exhibiting a condition, comprising, in combination:

variable power means for receiving an input signal representative of a desired motor performance level and responsively providing a power signal representative of a power level to be applied to said motor;

counter means for receiving said input signal and responsively providing a state signal representative of a particular winding in said motor to be energized;

power stage means, interconnected to both said variable power means and counter means, for receiving said power and state signals and responsively imposing said power level on said particular winding of said motor; and error correcting means, interconnected to said windings, for sensing said condition of one of said windings, analyzing said condition to detect deviation of said condition from a predetermined standard, and responsively providing a correction signal to said variable power means, whereby said variable power means responsively alters said power signal to bring said condition closer to said predetermined standard.

2. A control for a brushless, direct current motor, said motor including a plurality of windings, comprising, in combination:
- a variable power means for receiving an input signal representative of a desired motor performance level and responsively providing a power signal representative of a power level to be applied to said motor;
- counter means for receiving said input signal and responsively providing a state signal representative of a particular winding in said motor to be energized;
- power stage means, interconnected to both said variable power means and counter means, for receiving said power and state signals and responsively imposing said power level on said particular winding of said motor;
- error detection means, interconnected to both said counter means and one of said windings, for receiving said state signal, sensing said condition of said one of said windings as said particular winding is substantially isolated from said power stage means, detecting a level of deviation of said condition from a predetermined standard, and responsively providing an error signal related to said level of deviation; and
- error correction means, interconnected to said error detection means, for receiving said error signal and responsively providing a correction signal to said variable power means, whereby said variable power means responsively alters said power signal to bring said condition closer to said predetermined standard.

3. A control for a brushless, direct current motor, said motor including a plurality of windings, comprising, in combination:
- input means for receiving an input signal representative of a desired motor speed and responsively providing a selection signal representative of said desired motor speed;
- variable power means for receiving said selection signal and responsively providing a power signal representative of a power level to be applied to said motor;
- counter means for receiving said input signal and responsively providing a state signal representative of a particular winding in said motor to be energized;
- power stage means, interconnected to both said variable power means and counter means, for receiving said power and state signals and responsively imposing said power level on said particular winding of said motor;
- error detection means, interconnected to both said counter means and one of said windings, for receiving said state signal, sensing said condition of said one of said windings as said particular winding is substantially isolated from said power stage means, detecting a level of deviation of said condition from a predetermined standard, and responsively providing an error signal related to said level of deviation; and
- error correction means, interconnected to said error detection means, for receiving said error signal and responsively providing a correction signal to said variable power means, whereby said variable power means responsively alters said power signal to bring said condition closer to said predetermined standard.

4. A control circuit as claimed in claim 3 further comprising starting control means, interconnected to a winding, for sensing said condition of said winding, detecting that said condition of said winding is below a predetermined standard, and responsively providing a start signal to said correction means to indicate that said condition of said winding is below said predetermined standard.

5. A control circuit as claimed in claim 4 wherein said starting control means discontinues providing said start signal after said condition of said winding reaches a predetermined level.

6. A control circuit as claimed in claim 3 wherein said condition of said one of said windings comprises a voltage waveform of said one of said windings as said winding is substantially isolated from said power stage means and said error detection means senses said waveform and issues said error signal only while sensing a substantially zero segment of said waveform.

7. A control circuit as claimed in claim 6 wherein said voltage waveform of said one of said windings includes both beginning and ending portions and wherein said detection means issues a first error signal while sensing a negative segment of said waveform during said beginning portion of said waveform and issues a second error signal while sensing a negative segment of said waveform during said ending portion of said waveform.

8. A control circuit as claimed in claim 7 wherein said correction circuit receives said first error signal and responsively issues a first correction signal to increase said power signal provided by said variable power means and receives said second error signal and responsively issues a second correction signal to decrease said power signal provided by said variable power means.

9. A control circuit as claimed in claim 8 wherein said particular winding to be energized is distinct from said one of said windings whose condition is sensed by said error detection means.

* * * * *